United States Patent
Steib et al.

(10) Patent No.: US 7,505,501 B2
(45) Date of Patent: Mar. 17, 2009

(54) OPTOELECTRONIC PACKAGE

(75) Inventors: Michael Anton Steib, Treuchtlingen (DE); Hongyu Deng, Saratoga, CA (US); Ralph H. Johnson, Murphy, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/559,322

(22) Filed: Nov. 13, 2006

(65) Prior Publication Data

US 2007/0110372 A1 May 17, 2007

Related U.S. Application Data

(60) Provisional application No. 60/736,463, filed on Nov. 14, 2005.

(51) Int. Cl.
*H01S 5/00* (2006.01)
(52) U.S. Cl. ........................ 372/50.11; 385/88
(58) Field of Classification Search .............. None
See application file for complete search history.

(56) References Cited

U.S. PATENT DOCUMENTS

| 4,676,644 A | 6/1987 | Canteloup |
| 6,842,467 B1 * | 1/2005 | Aronson et al. ............... 372/27 |
| 2002/0150135 A1 * | 10/2002 | Naone et al. .................. 372/45 |

OTHER PUBLICATIONS

Eugene Hecht, Polarization, Optics, 1987, p. 306, Second Edition, Addison-Wesley Publishing Company.
K. Petermann, Semiconductor Lasers with Optical Feedback, Laser Diode Modulation and Noise, 1991, pp. 250-290, Kluwer Academic Publishers, Dordrecht, The Netherlands.

* cited by examiner

*Primary Examiner*—Sung H Pak
*Assistant Examiner*—Chad H Smith
(74) *Attorney, Agent, or Firm*—Workman Nydegger

(57) ABSTRACT

An optoelectronic package having passive optical components that are configured to reduce the amount of optical back reflection that reaches an optoelectronic device housed within the optoelectronic package. In one example, the optoelectronic package includes an optoelectronic device, a wave plate, and a linear polarizer. The optoelectronic device is configured to emit an optical signal along an optical path. The wave plate is positioned in the optical path of the optoelectronic device. The linear polarizer is positioned in the optical path of the optoelectronic device between the optoelectronic device and the wave plate.

9 Claims, 3 Drawing Sheets

OPTOELECTRONIC PACKAGE

RELATED APPLICATIONS

This application claims the benefit of U.S. Provisional Patent Application Ser. No. 60/736,463, entitled PACKAGED LONG WAVELENGTH VERTICAL CAVITY SURFACE-EMITTING LASERS FOR OPTICAL DATA COMMUNICATION, filed Nov. 14, 2005, and incorporated herein in its entirety by this reference.

BACKGROUND OF THE INVENTION

1. The Field of the Invention

The present invention relates to an optoelectronic package. More specifically, the present invention relates to an optoelectronic package having passive optical components that are configured to manage optical back reflection and thereby facilitate improved performance of an optoelectronic device housed within the optoelectronic package.

2. Related Technology

Optoelectronic packages are used in the field of fiber optic communication to house an optoelectronic device. In addition, optoelectronic packages may also house other optical and electrical components associated with the optoelectronic device. One example of an optoelectronic package is a transistor outline ("TO") package, commonly known as a "TO-can." The optoelectronic device housed within an optoelectronic package is a transducer used to convert optical data signals to electrical data signals or electrical data signals to optical data signals. Examples of optoelectronic devices include edge emitting lasers, such as Fabry-Perot lasers, distributed feedback lasers, and surface emitting lasers, such as vertical cavity surface emitting lasers ("VCSELs") including long wavelength ("LW") VCSELs.

One common problem in optoelectronic packages is optical back reflection ("OBR"). OBR can cause interference with optical data signals, a phenomenon commonly known as "noise." Certain types of edge emitting lasers and surface emitting lasers, such as LW VCSELS, are particularly sensitive to OBR.

One approach to reduce noise caused by OBR in optoelectronic packages involves the use of optical isolators. Optical isolators function to block OBR from reaching the optoelectronic device housed within the optoelectronic package. While the use of optical isolators can help prevent OBR from reaching an optoelectronic device housed within an optoelectronic package, and thereby maintain noise below acceptable levels, the cost of optical isolators can be prohibitive.

BRIEF SUMMARY OF EXAMPLE EMBODIMENTS

In general, example embodiments of the invention relate to an optoelectronic package having two or more passive optical components configured and arranged to manage the amount of optical back reflection that reaches an optoelectronic device housed within the optoelectronic package. By managing the optical back reflection in this way, corresponding control of noise may be achieved in the optoelectronic package, thereby contributing to improved performance of the optoelectronic package.

In one example embodiment, an optoelectronic package includes an optoelectronic device, a wave plate, and a linear polarizer. The optoelectronic device is configured to emit an optical signal along an optical path. The wave plate is positioned in the optical path of the optoelectronic device. The linear polarizer is also positioned in the optical path of the optoelectronic device between the optoelectronic device and the wave plate.

In another example embodiment, an LW VCSEL optoelectronic package includes a long wavelength ("LW") vertical cavity surface-emitting laser ("VCSEL"), a quarter wave plate ("QWP"), and a linear polarizer. The LW VCSEL is configured to emit an optical signal along an optical path. The emitted optical signal has a particular polarization. The quarter-wave plate ("QWP") is positioned in the optical path of the LW VCSEL. The QWP has a fast axis that is offset about 45° from the polarization of the optical signal that the LW VCSEL is configured to emit. The linear polarizer is positioned between the LW VCSEL and the QWP in the optical path of the LW VCSEL. The linear polarizer is substantially aligned with the polarization of the optical signal that the LW VCSEL is configured to emit.

In yet another example embodiment, a method for qualifying an optoelectronic package includes several acts. First, an optical signal is generated using an optoelectronic device. Then, the optical signal is polarized to a first linear polarization state. Next, components of the polarized optical signal are phase shifted to form a circular polarization state. Then, a portion of the phase-shifted optical signal is reflected off a near-end surface back toward the optoelectronic device. Next, the components of the reflected portion of the optical signal are phase shifted from the circular polarization state to a second linear polarization state that is about 90° from the first linear polarization state. Then, the phase-shifted reflected portion of the optical signal is polarized to the first linear polarization state. Next, a relative intensity noise level associated with the optoelectronic device is measured. Then, the measured relative intensity noise level is compared to a relative intensity noise level specified by a protocol. Finally, if the measured relative intensity noise level is within an acceptable maximum deviation from the relative intensity noise level specified by the protocol, then the optoelectronic package is qualified.

These and other aspects of example embodiments of the present invention will become more fully apparent from the following description and appended claims.

BRIEF DESCRIPTION OF THE DRAWINGS

To further clarify the above and other aspects of the present invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of exemplary embodiments of the invention, and are not limiting of the present invention nor are they necessarily drawn to scale. The invention will be disclosed and explained with additional specificity and detail through the use of the accompanying drawings in which.

DETAILED DESCRIPTION OF EXAMPLE EMBODIMENTS

As noted above, example embodiments of the invention relate to an optoelectronic package having two or more passive optical components configured and arranged to manage the amount of optical back reflection ("OBR") that reaches an optoelectronic device housed within the optoelectronic package. By managing the OBR in this way, corresponding control of noise may be achieved in the optoelectronic package, thereby contributing to improved performance of the optoelectronic package.

As used herein, the term "optoelectronic package" refers to any package that houses an optoelectronic device. The term "optoelectronic device" as used herein refers to an electrical-to-optical or optical-to-electrical transducer. The optoelectronic devices disclosed herein can be configured to transmit or receive optical signals according to a variety of protocols at a variety of line rates. For example, the optoelectronic devices disclosed herein can be configured to handle optical signals according to Optical Fast Ethernet, Optical Gigabit Ethernet, 1× Fibre Channel, 2× Fibre Channel, 4× Fibre Channel, SONET OC-3, SONET OC-12, SONET OC-48, SONET OC-192, SONET OC-768, 10× Fibre Channel, or 10 Gigabit Ethernet. Similarly, the optoelectronic devices disclosed herein can be configured to operate at a nominal speed of 155 Mb/s, 200 Mb/s, 622 Mb/s, 1.25 Gb/s, 2.125 Gb/s, 2.67 Gb/s, 4.25 Gb/s, 10.3 Gb/s, 10.5 Gb/s, 10.7 Gb/s, or 11.1 Gb/s.

I. Example Optoelectronic Package

Figure 1:
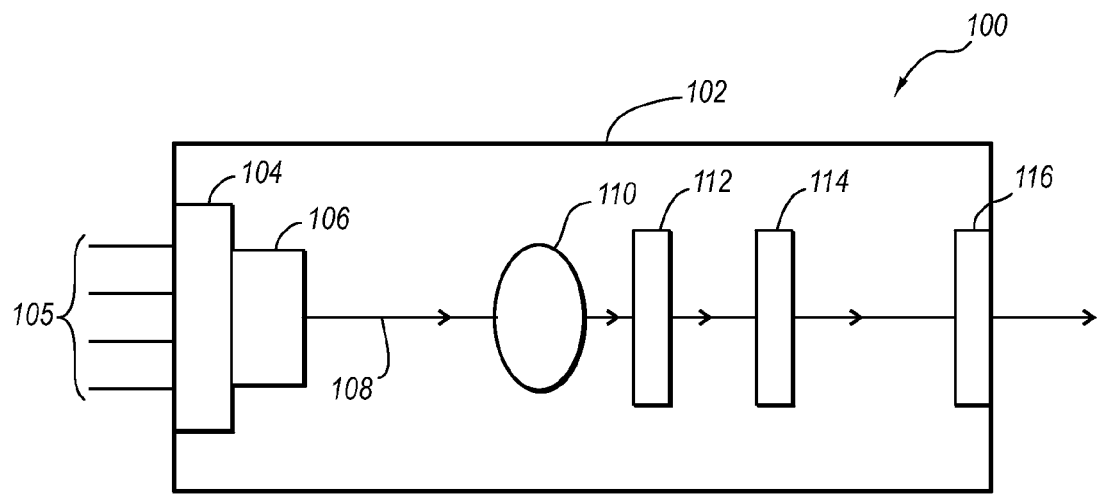
FIG. 1 discloses an example optoelectronic package.

With reference now to FIG. 1, an example optoelectronic package 100 is disclosed. The example optoelectronic package 100 includes a housing 102. The housing 102 is a transistor outline (TO) housing, commonly known as a "TO-can." As such, the housing 102 is configured to be incorporated into a transmitter optical subassembly ("TOSA") (not shown).

The housing 102 includes a TO-can header 104 which includes electrical elements 105 and to which an optoelectronic device 106 is mounted. One or more of the electrical elements 105 is configured to receive an electrical data signal and conduct the electrical data signal through the header 104 to the optoelectronic device 106. One or more of the electrical elements 105 is also configured to receive an electrical current and conduct the electrical current through the header 104 to provide power to the optoelectronic device 106. One or more of the electrical elements 105 is further configured to receive a control signal and conduct the control signal through the header 104 to the optoelectronic device 106. In this example, the optoelectronic device 106 is a long wavelength ("LW") vertical cavity surface-emitting laser ("VCSEL"). The terms "long wavelength vertical cavity surface-emitting laser" and "LW VCSEL" as used herein refer to a VCSEL configured to emit an optical data signal having a wavelength between about 1200 nm and about 1900 nm, or even longer wavelengths. The scope of the invention is not limited to LW VCSELs, however, and other types of optoelectronic devices can also be employed in connection with example embodiments of the invention.

In one example embodiment, the optoelectronic device 106 is a LW VCSEL that is grown on a GaAs substrate using molecular beam epitaxy ("MBE"). An active region of the LW VCSEL includes three 55 Å InGaAsN quantum wells separated by GaAs spacer layers. The active region of the LW VCSEL is sandwiched between a p-type GaAs conduction layer and an n-type GaAs conduction layer. The p-type GaAs conduction layer is positioned above the active region and the n-type GaAs conduction layer is positioned below the active region. The p-type and n-type GaAs conduction layers are configured as intra-cavity contacts for the LW VCSEL. The p-type and n-type GaAs conduction layers are sandwiched between a bottom distributed Bragg reflector ("DBR") of 37 undoped AlGaAs/GaAs pairs and a top 8-pair dielectric DBR.

The optoelectronic device 106 is configured as an electrical-to-optical transducer. As such, the optoelectronic device 106 is configured to receive an electrical data signal by way of the electrical elements 105 as input and emit a corresponding optical data signal 108 as output. The optoelectronic device 106 is further configured to emit the optical data signal 108 along an optical path, where the optical path is schematically represented by the arrows in FIG. 1. In addition, the optoelectronic device 106 is configured to emit the optical data signal 108 with a known polarization.

Depending on the needs of a particular application, the optoelectronic device 106 is configured to emit the optical data signal 108 at one of various wavelengths. For example, the optoelectronic device 106 may be configured to emit an optical data signal 108 having a wavelength of 1310 nm or 1550 nm. In addition, the optoelectronic device 106 can be configured to operate at various data rates. For example, the optoelectronic device 106 may be configured to operate at a nominal speed of about 4.25 Gb/s or about 10 Gb/s, or greater.

With continued reference to FIG. 1, the optoelectronic package 100 further includes a lens 110, a linear polarizer 112, a wave plate 114 and a window 116, each of which lies in the optical path of the optical data signal 108. The function of each of these components will now be described in turn.

In this example, the lens 110 is an aspheric lens, although other lenses may be used including, but not limited to, ball lenses and half-ball lenses. The lens 110 is configured and positioned to focus the optical data signal 108 as the optical data signal 108 passes through the lens 110. In one alternative embodiment, the lens 110 can be combined with one or more additional lenses to further focus or otherwise process the optical data signal 108. In another alternative embodiment, the lens 110 can be omitted and the data signal 108 can pass from the optoelectronic device 106 to the linear polarizer 112 without first passing thru a lens.

The linear polarizer 112 is configured to polarize the optical data signal 108 as the optical data signal 108 passes through the linear polarizer 112. In one example embodiment, the linear polarizer 112 can be substantially aligned to the known polarization of the optoelectronic device 106 so that the optical data signal 108 passes through the linear polarizer 112 with relatively little attenuation.

The wave plate 114 is configured to phase shift the optical data signal 108 as the optical data signal 108 passes through the wave plate 114. In general, a wave plate is an optical device that alters the polarization state of a light wave traveling through it. In one example embodiment, the wave plate 114 is a quarter wave plate ("QWP") that is configured to phase shift the components of the optical data signal 108 by about 90° of phase as the optical data signal 108 passes through the QWP. As such, the QWP is configured to cause a quarter wavelength phase shift in components of the optical data signal 108 as the optical data signal 108 passes through the QWP. In this example embodiment, the fast axis of the QWP is offset about 45° from the known polarization of the optoelectronic device 106. As the optical data signal 108 passes through the QWP, the optical data signal 108 is shifted from a substantially linearly polarized optical data signal to a substantially circularly polarized optical data signal.

The window 116 is configured to allow the optical data signal 108 to exit the housing 102. In general, the window 116 can be made from any light transmissive material. In one alternative embodiment, the window 116 can be omitted altogether.

II. Operation of the Example Optoelectronic Package

In operation, the optoelectronic package 100 is configured to manage the near-end OBR within the optoelectronic package 100 that reaches the optoelectronic device 106, using inexpensive and simple optical components. More particularly, example embodiments of the optoelectronic package 100 use simple and inexpensive components such as the aforementioned linear polarizer 112 and wave plate 114 to provide a relative reduction in the amount of OBR that reaches the optoelectronic device 106.

In one example embodiment where the wave plate 114 is a QWP, when any portion of the circularly polarized optical data signal 108 is reflected backward as near-end OBR toward the optoelectronic device 106, the circular polarization of the optical data signal 108 emitted by the optoelectronic device 106 is substantially maintained notwithstanding being reflected as near-end OBR.

Particularly, as the near-end OBR passes through the QWP, the circularly polarized OBR is converted back into linearly polarized OBR that is oriented about 90° to the original linear polarization of the optical data signal 108. As the linearly polarized near-end OBR reaches the linear polarizer 112, the linear polarizer 112 blocks substantially all of the near-end OBR. As a result, the amount of near-end OBR that reaches the optoelectronic device 106 is reduced to a level below which would otherwise be achieved. By controlling near-end OBR in this way, a corresponding reduction in the level of noise in the optoelectronic package 100 can be achieved. A reduction in the level of noise in the optoelectronic package 100 can result in lower error rates in optical communication between the optoelectronic package 100 and another optical device.

Although the example optoelectronic package 100 disclosed herein houses a long wavelength ("LW") vertical cavity surface-emitting laser ("VCSEL"), the configuration of the optoelectronic package 100 can be applied in other optoelectronic packages that house other types of optoelectronic devices. For example, optoelectronic packages that house edge emitting lasers or other types of surface emitting lasers can benefit from the arrangement of the linear polarizer 112 and the wave plate 114. Therefore, the scope of the invention is not limited to optoelectronic packages housing LW VCSELs, nor is the invention limited to the type, number, or arrangement of components in FIG. 1.

III. Example Experimental Setup

Figure 2:
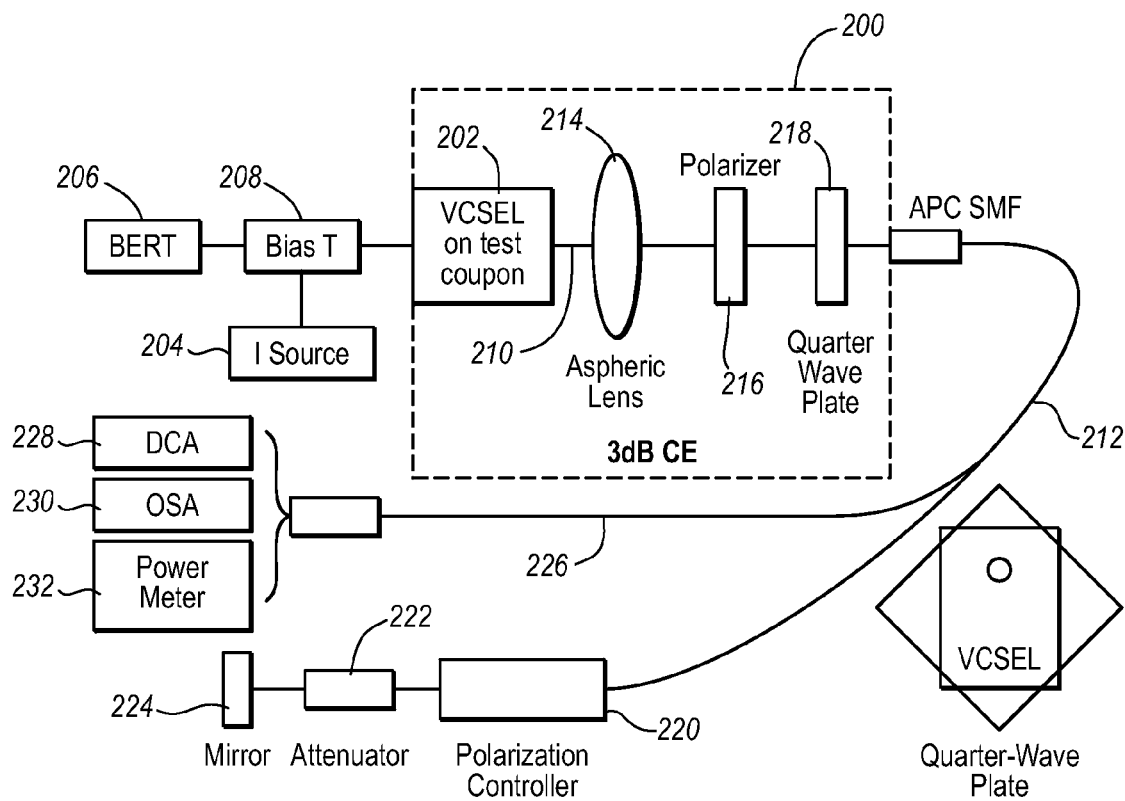
FIG. 2 discloses an example experimental setup for testing an optoelectronic package.

In one experiment setup disclosed in FIG. 2, an optoelectronic package 200 was configured similar to the above example optoelectronic package 100. The optoelectronic package 200 includes a VCSEL 202 mounted on a high speed test coupon. The VCSEL is driven by a DC current source 204. The DC current source 204 is modulated by a bit error rate tester ("BERT") 206 through a bias tee 208. An optical signal 210 generated by the VCSEL 202 is coupled into an angle cleaved ("APC") single mode fiber ("SMF") 212 using an aspheric lens 214. Adjacent to and in the path of optical signal 210 emitted from the VCSEL 202, a linear polarizer 216 can be positioned and aligned to the polarization of the optical signal 210. Next to the linear polarizer 216, a QWP 218 is positioned with its fast axis offset about 45° from the polarization of the optical signal 210. The coupling efficiency ("CE") into the SMF 212 is maintained in this example at −3 dB. The SMF 212 passes through a polarizer controller 220 and an attenuator 222 before arriving at a mirror 224. A second SMF 226 branches off of the SMF 212. The second SMF 226 connects the optoelectronic package 200 to optical measurement equipment such as Digital Communications Analyzer ("DCA") 228, Optical Spectrum Analyzer ("OSA") 230, or power meter 232. The optical signal is then reflected by the mirror back along the SMF toward the VCSEL. The amount of light that effectively returns into the optoelectronic package 200 depends on the optical coupling loss into the SMF and the attenuation through the rest of the optical path. The amount of reflected light injected into the optical package ranges from −7 dB to −60 dB in this setup.

IV. Experimental Results

Figure 3:
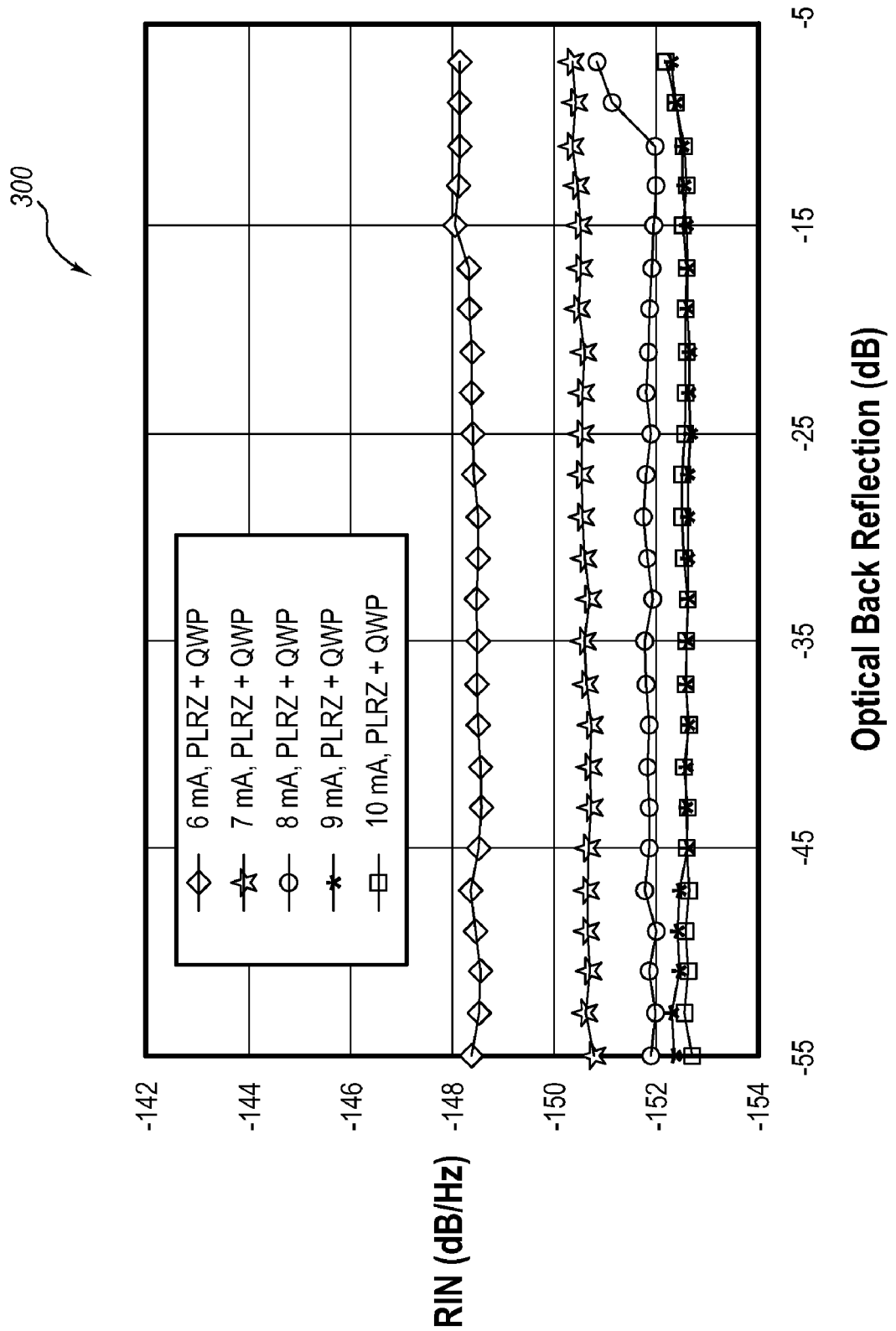
FIG. 3 discloses results generated from an experiment conducted using the experimental setup of FIG. 2.

FIG. 3 shows the relative intensity noise ("RIN") of the VCSEL within the optoelectronic package 200 at several bias currents under different levels of OBR. The RIN relates the noise of the optical power to the mean power $\overline{P(t)}$ and can be written as:

$$RIN = \frac{\overline{P(t)^2 - \overline{P(t)}^2}}{\overline{P(t)}^2},$$

where P(t) is the time-dependent VCSEL output power at a given polarization state, and $\overline{P(t)}$ is the VCSEL mean power at that polarization state.

In one experiment performed on the optical package 200, the LW VCSEL was powered by a DC bias currents from 6 mA to 10 mA as various amounts of OBR were introduced into the optoelectronic package 200. The corresponding RIN levels in the optoelectronic package were measured and compared to the requirements of the 2× Fibre Channel specification. By way of reference, the 2× Fibre Channel specification requires a maximum $RIN_{12}(OMA)$ of −120 dB/Hz, which corresponds to roughly −138 dB/Hz maximum RIN spec under DC bias. As amounts of OBR ranging from −7 dB to −60 dB were directed through the QWP and linear polarizer toward, the levels of RIN within the optoelectronic package were measured. Even under the worst case measured, −7 dB OBR, the requirements of the 2× Fibre Channel specification were met with comfortable margins. The results of this experiment are disclosed in a chart 300 in FIG. 3.

This experiment confirmed that the arrangement of the optoelectronic device 106, linear polarizer 112, and wave plate 114 disclosed in FIG. 1 can be used to beneficially control the amounts of OBR that reach the optoelectronic device 106. This decrease in OBR results in reduced levels of noise within the optoelectronic package 100 and, thus, improved performance of the optoelectronic device 106.

IV. Example Method for Qualifying an Optoelectronic Package

Figure 4:
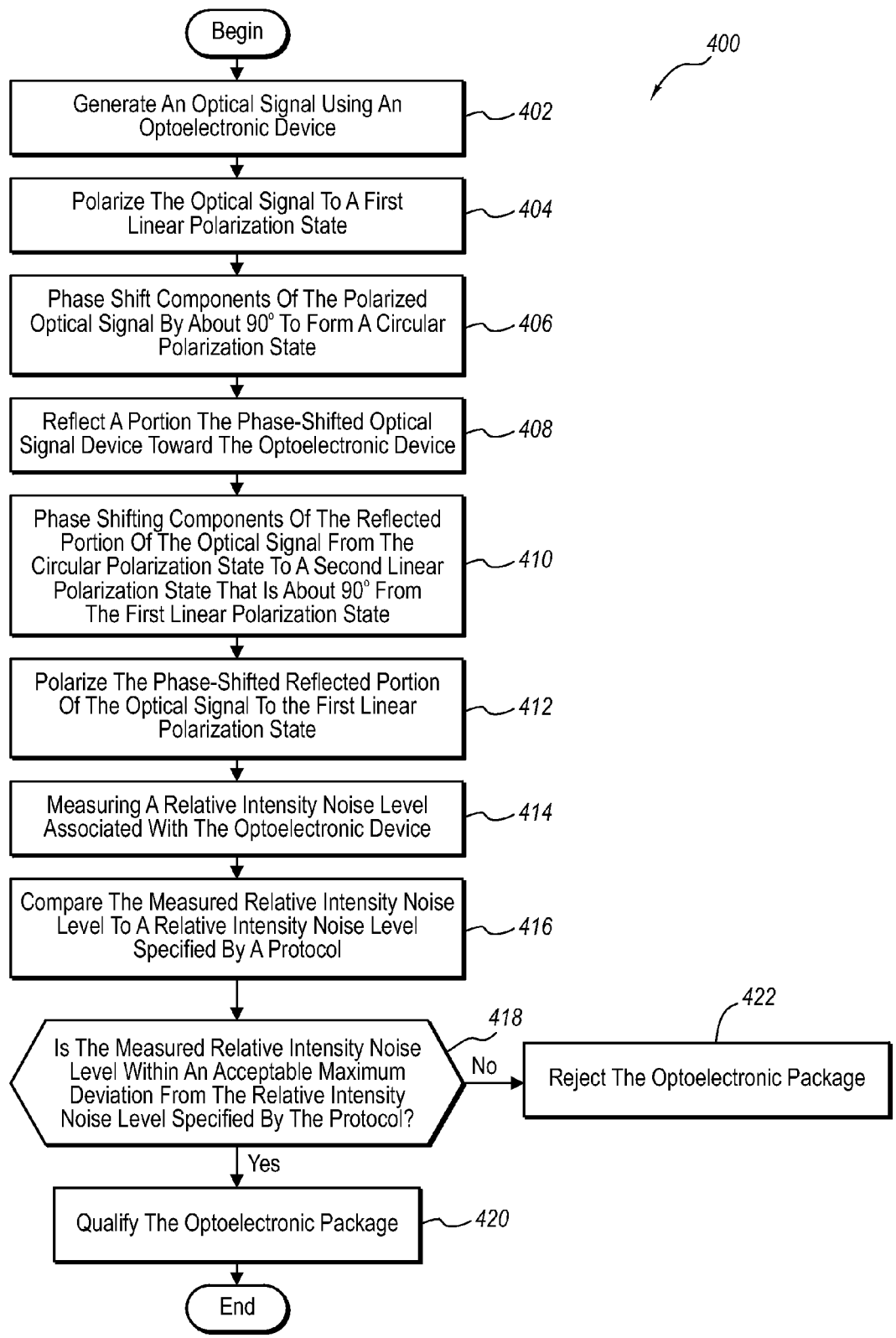
FIG. 4 discloses an example method for qualifying an optoelectronic package.

With reference now to FIG. 4, an example method 400 for qualifying an optoelectronic package is disclosed. The example method 400 includes various acts that can be used to qualify or reject an optoelectronic package, such as the optoelectronic package 100 or the optoelectronic package 200, disclosed herein.

The example method 400 includes an act 402 of generating an optical signal using an optoelectronic device. For example, the VCSEL 202 of the optoelectronic package 202 can be used to generate an optical signal 210.

The example method 400 also includes an act 404 of polarizing the optical signal to a first linear polarization state. For example, the polarizer 216 can be used to polarize the optical signal 210 to a first linear polarization state.

The example method 400 further includes an act 406 of phase shifting the components of the polarized optical signal by about 90° to create a circular polarization state. For example, the QWP 218 can be used to phase shift the components of the polarized optical signal 210 by about 90° from the first linear polarization state to a circular polarization state.

The example method 400 also includes an act 408 of reflecting a portion of the phase-shifted optical signal back toward the optoelectronic device. For example, the mirror 224 can be use to reflect a portion of the phase-shifted optical signal 210 back toward the VCSEL 202.

The example method 400 further includes an act 410 of phase shifting the reflected portion of the optical signal from the circular polarization state to a second linear polarization state that is about 90° from the first linear polarization state. For example, the QWP 218 can be used to phase shift the reflection portion of the optical signal 210 from the circular polarization state to a second linear polarization state that is about 90° from the first linear polarization state.

The example method 400 also includes an act 412 of polarizing the phase-shifted reflected portion of the optical signal to the first linear polarization state. For example, the linear polarizer 216 can be used to polarize the phase-shifted reflection portion of the optical signal 210 to the first linear polarization state. Since the phase-shifted reflection portion of the optical signal is about 90° from the first linear polarization state, the linear polarizer 216 blocks substantially all of the phase-shifted reflection portion of the optical signal.

The example method 400 further includes an act 414 of measuring a relative intensity noise level associated with the optoelectronic device. For example, the relative intensity noise level associated with the VCSEL 202 can be measured.

The example method 400 also includes an act 416 of comparing the measured relative intensity noise level to a relative intensity noise level specified by a protocol. For example, the measured relative intensity noise level of the VCSEL 202 can be compared to a relative intensity noise level specified by any of the protocol disclosed herein such as 2× Fibre Channel.

The example method 400 further includes an act 418 of determining if the measured relative intensity noise level is within an acceptable maximum deviation from the relative intensity noise level specified by the protocol. If so, the example method 400 proceeds to an act 420 of qualifying the optoelectronic package. If not, the example method 400 proceeds to an act 422 of rejecting the optoelectronic package. For example, if the measured relative intensity noise level of the VCSEL 202 is within an acceptable maximum deviation from the relative intensity noise level specified by the 2× Fibre Channel protocol, the optoelectronic package 200 can be qualified as being in compliance with the 2× Fibre Channel protocol. On the other hand, if the measured relative intensity noise level of the VCSEL 202 is not within an acceptable maximum deviation from the relative intensity noise level specified by the 2× Fibre Channel protocol, the optoelectronic package 200 can be rejected as being noncompliant with the 2× Fibre Channel protocol. In this context, the "acceptable maximum deviation" is a predetermined value that can be, for example, user-specified or specified by the specific protocol.

The present invention may be embodied in other specific forms without departing from its spirit or essential characteristics. The described embodiments are to be considered in all respects only as illustrative and not restrictive. The claims are not exhaustive of the embodiments of the invention, nor are they to be construed as limiting the scope of the invention.

We claim:

1. A long wavelength ("LW") vertical cavity surface-emitting laser ("VCSEL") optoelectronic package comprising:
   an LW VCSEL configured to emit an optical signal along an optical path, the LW VCSEL including:
      an active region;
      a p-type intracavity contact positioned above the active region;
      an n-type intracavity contact positioned below the active region;
      a top Distributed Bragg Reflector (DBR) positioned above the p-type intracavity contact, the top DBR including about eight pairs; and
      a bottom Distributed Bragg Reflector (DBR) positioned below the n-type intracavity contact, the bottom DBR including about thirty seven pairs;
   a quarter-wave plate ("QWP") positioned in the optical path, the QWP having a fast axis that is offset about 45.degree. from a polarization of the optical signal; and
   a linear polarizer positioned in the optical path between the LW VCSEL and the QWP, the linear polarizer being substantially aligned with the polarization of the optical signal.

2. The optoelectronic package of claim 1, wherein the LW VSCEL, the linear polarizer and the QWP are packaged in a transistor outline ("TO") package that is configured to be incorporated into a transmitter optical subassembly ("TOSA").

3. The optoelectronic package of claim 1, wherein the LW VCSEL is configured to emit an optical data signal having a wavelength of: about 1310 nm; or about 1550 nm.

4. The optoelectronic package of claim 1, wherein the LW VCSEL active region includes about three 55.ANG. InGaAsN quantum wells separated by GaAs spacer layers.

5. The optoelectronic package of claim 1, wherein the bottom DBR pairs comprise undoped AlGaAs/GaAs pairs.

6. The optoelectronic package of claim 1, wherein the LW VCSEL is compatible with a nominal data rate of: 4.25 Gbits/s; or 10 Gbits/s.

7. The optoelectronic package of claim 1, wherein the LW VCSEL is substantially compliant with the 2× Fibre Channel specification for an optical back reflection greater than about −20 dB at the wave plate.

8. The optoelectronic package of claim 1, further comprising a lens positioned in the optical path between the LW VCSEL and the linear polarizer.

9. The optoelectronic package of claim 1, wherein the LW VCSEL exhibits single transverse mode behavior in operation.

* * * * *

UNITED STATES PATENT AND TRADEMARK OFFICE
CERTIFICATE OF CORRECTION

PATENT NO. : 7,505,501 B2  Page 1 of 1
APPLICATION NO. : 11/559322
DATED : March 17, 2009
INVENTOR(S) : Steib et al.

It is certified that error appears in the above-identified patent and that said Letters Patent is hereby corrected as shown below:

Column 6
Line 27, delete the indent before "where"
Line 64, change the 2$^{nd}$ "202" to --200--

Column 7
Line 13, change "use" to --used--

Column 8
Line 27, Claim 1, change "45.degree." to --45°--

Signed and Sealed this

Twenty-third Day of February, 2010

David J. Kappos
*Director of the United States Patent and Trademark Office*